C. WHITTIER.
Processes of Treating Refuse Matter.
No. 143,482.  Patented Oct. 7, 1873.
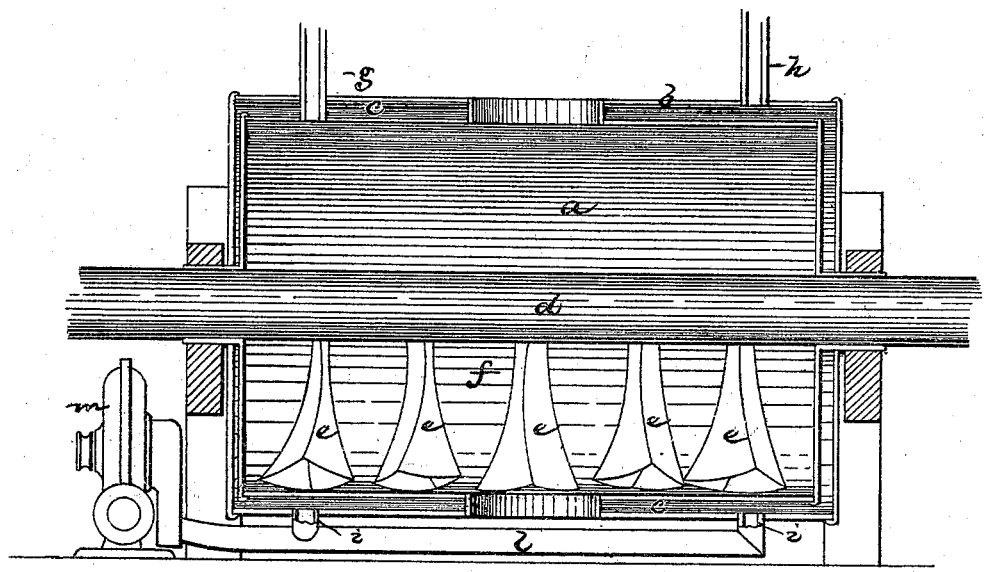
Witnesses.
M. W. Frothingham.
L. H. Latimer.
Inventor.
Charles Whittier
By his Attys.
Crosby & Gould

UNITED STATES PATENT OFFICE.

CHARLES WHITTIER, OF BOSTON, MASSACHUSETTS, ASSIGNOR TO WILLIAM L. BRADLEY, OF SAME PLACE.

IMPROVEMENT IN PROCESSES OF TREATING REFUSE MATTER.

Specification forming part of Letters Patent No. 143,482, dated October 7, 1873; application filed May 6, 1873.

*To all whom it may concern:*

Be it known that I, CHARLES WHITTIER, of Boston, in the county of Suffolk and State of Massachusetts, have invented an Improvement in Treating Refuse Animal Matter; and I do hereby declare that the following, taken in connection with the drawings which accompany and form part of this specification, is a description of my invention sufficient to enable those skilled in the art to practice it.

United States Letters Patent No. 134,844, dated January 14, 1873, have been granted to William L. Bradley for an improvement in treating animal matter; and in the apparatus shown in said patent a hollow rotary shaft is used, running axially through a horizontal stationary drum, said shaft having opening from it hollow radial arms, that direct the air upon and into the material placed in the drum; and, to heat the drum, it is jacketed with an annular steam-chamber.

My invention embodies or may embody said Bradley's construction, but differs from it as to the means for heating the drum.

In using steam it is practically impossible to make the seams or joints so tight as to wholly prevent leakage, and as the purpose of the apparatus is to dry the material, or deprive it of its moisture, it defeats its object when the heated material, being itself water or vapor, enters the drying-chamber.

To obviate this I use with said Bradley's apparatus, or with an organization similar thereto, an annular chamber supplied with a current of hot air driven or drawn through it, the chamber not needing then to be steam-tight, as, if not perfectly tight as to the partition separating it from the drier-chamber, it only results in driving hot air into the material to be dried by a similar agent.

My invention consists in combining with the horizontal cylinder an annular encompassing hot-air chamber, and suitable mechanism for driving or drawing through it the current of hot air; or the invention may be stated as consisting in the process of treating animal matter in such an apparatus as Bradley's, the horizontal drum being heated by the current of hot air drawn or driven through the annular chamber.

The drawing represents in sectional elevation the Bradley apparatus, embodying my invention.

$a$ denotes the drum or inner cylinder; $b$, the outer cylinder; and $c$, the annular space encompassing the same, said space extending between the heads, if desirable. The cylinders $a$ $b$ are stationary, and $d$ denotes the hollow rotary shaft extending axially through them, said shaft having the hollow radial arms $e$, the shaft and arms being air-passages through which hot air is blown into the chamber $f$, and through the material, escaping from the chamber $f$ through the escape-pipe $g$, charged with moisture evolved from the matter contained in the chamber $f$ to be dried. Leading into the annular heater-chamber $c$ is a hot-air inlet-pipe, $h$, and leading from said chamber are outlet-pipes $i$ $i$ extending into a pipe, $l$, which connects with an exhaust-blower, $m$. The pipe $h$ leads from a suitable source of hot-air supply, and, by means of the blower $m$, the hot air is drawn into and through the chamber $c$, thereby keeping the inner surfaces of the cylinder at all times hot, without liability to admission of water or vapor into the chamber $f$ through leakages in the seams, as is the case in using the steam-chamber between the cylinders, leakages admitting only air, which, so far as the material is concerned, acts as an aid to the evaporation of its moisture.

I do not claim, in an apparatus for treating animal matter, either a jacketed cylinder or hollow stirrers, as they are not my invention.

I claim—

The method of treating animal matter by inclosing and mechanically agitating the matter in a horizontal drum or cylinder, into which air is introduced, the cylinder being heated by a current of hot air forced through an annular chamber encompassing the horizontal cylinder.

Executed this 21st day of April, A. D. 1873.

CHARLES WHITTIER.

Witnesses:
 FRANCIS GOULD,
 M. W. FROTHINGHAM.